US012637984B1

(12) United States Patent
Pescosolido et al.

(10) Patent No.: US 12,637,984 B1
(45) Date of Patent: May 26, 2026

(54) EPICYCLIC GEAR REDUCTION CARRIER AND TORQUE FRAME CONNECTION

(71) Applicant: RTX Corporation, Farmington, CT (US)

(72) Inventors: Alessio Pescosolido, Rzeszow (PL); David A. Carroll, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/098,509

(22) Filed: Apr. 2, 2025

(51) Int. Cl.
F02C 7/36 (2006.01)

(52) U.S. Cl.
CPC ............ F02C 7/36 (2013.01); *F05D 2220/36* (2013.01); *F05D 2260/40311* (2013.01)

(58) Field of Classification Search
CPC .......... F02C 7/32; F02C 7/36; F05D 2220/36; F05D 2260/40311
See application file for complete search history.

(56) References Cited

U.S. PATENT DOCUMENTS 6,855,089 B2 * 2/2005 Poulin ................... F16H 57/082
475/331
7,223,197 B2 5/2007 Poulin et al.

8,061,975 B2 * 11/2011 Davis ..................... H01R 39/64
415/161
8,585,539 B2 * 11/2013 Sheridan ............... F16H 57/021
475/346
8,974,344 B2 3/2015 McCune et al.
9,267,389 B2 * 2/2016 Pescosolido .......... F16H 57/025
10,196,989 B2 2/2019 McCune et al.
12,168,959 B2 * 12/2024 McCune .................. F02K 3/06
2016/0146112 A1 * 5/2016 Van der Merwe ........ F02C 7/36
475/331
2023/0407796 A1 * 12/2023 McCune ................... F02C 7/36

* cited by examiner

*Primary Examiner* — Brian P Wolcott
(74) *Attorney, Agent, or Firm* — Carlson, Gaskey & Olds, P.C.

(57) ABSTRACT

A gas turbine engine includes a turbine section having at least one turbine rotor. A compressor section includes at least one compressor rotor, and a propulsor. The at least one turbine rotor is connected to drive an epicyclic gear reduction to in turn drive the propulsor at a slower speed than the at least one turbine rotor. The epicyclic gear reduction includes a sun gear for receiving a drive input from the at least one turbine rotor and having gear teeth engaging gear teeth on a plurality of intermediate gears. The intermediate gears are mounted within a carrier. The teeth on the intermediate gears also engage teeth on a ring gear. One of the carrier and the ring gear is connected to drive a propulsor drive shaft to in turn drive the propulsor, and the other of the carrier and the ring gear connected to static structure, with the carrier connected to either the propulsor drive shaft or the static structure through a torque frame. The torque frame is connected to the carrier at a radially outer location through a splined connection.

18 Claims, 6 Drawing Sheets

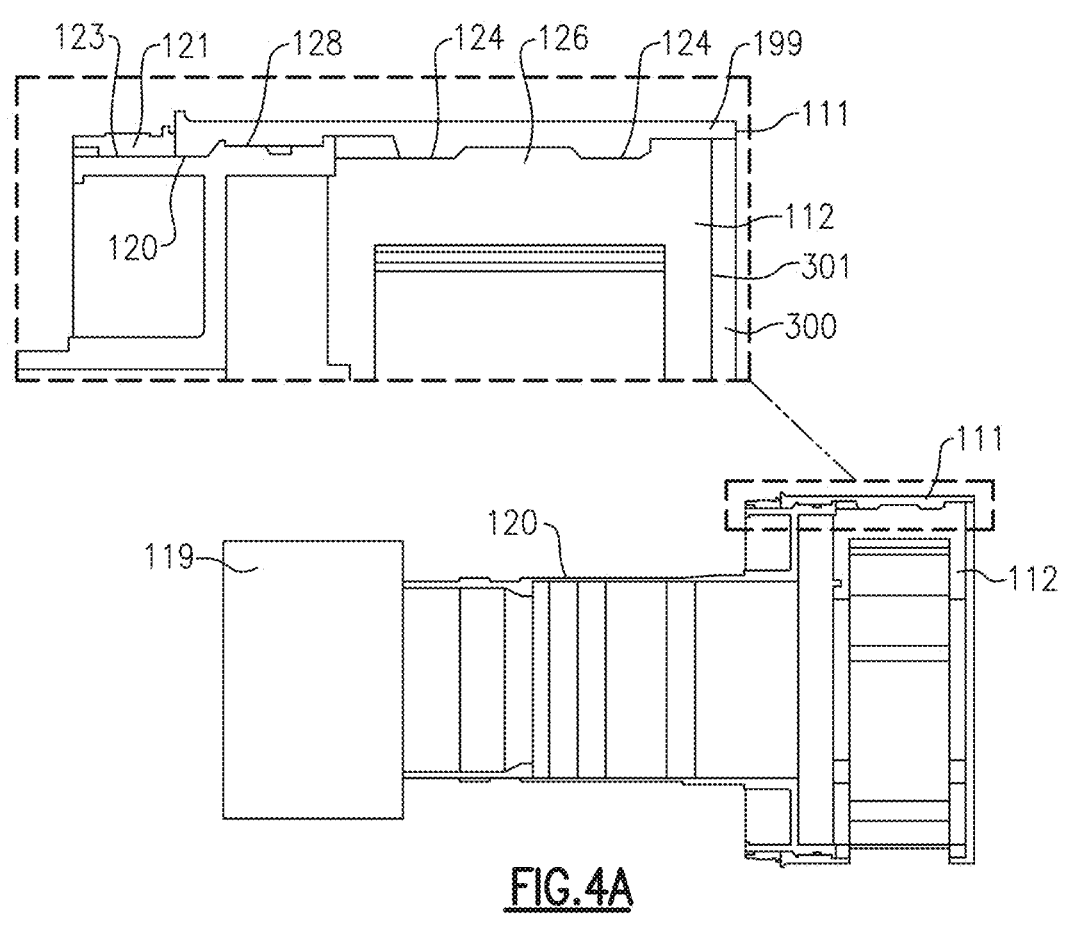
FIG.4A
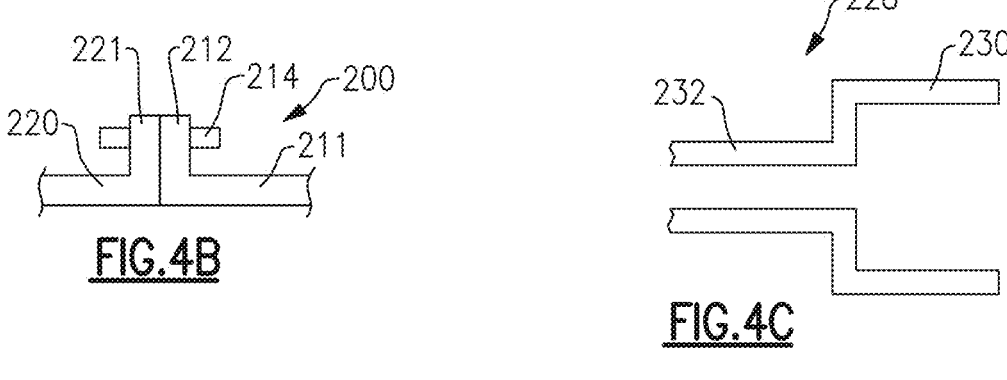
FIG.4B
FIG.4C
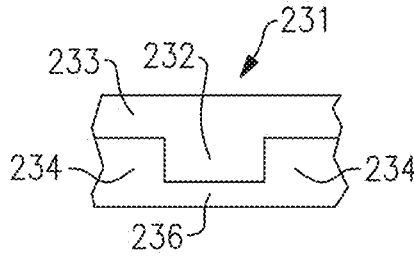
FIG.4D

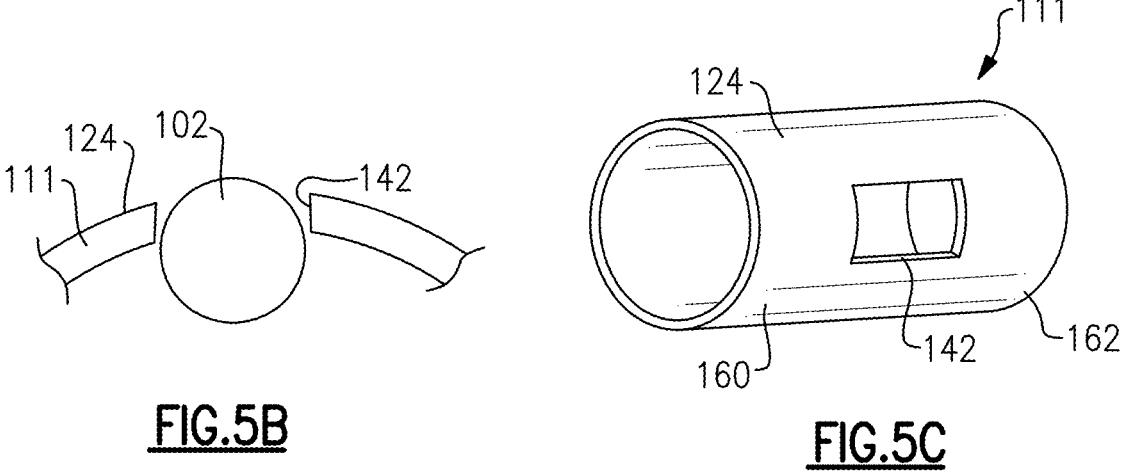
FIG.5B
FIG.5C
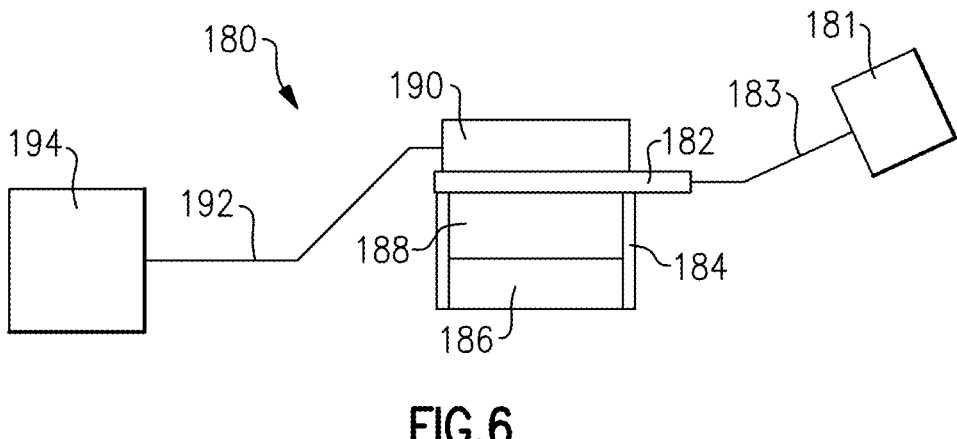
FIG.6

EPICYCLIC GEAR REDUCTION CARRIER AND TORQUE FRAME CONNECTION

BACKGROUND OF THE INVENTION

This application relates to an epicyclic gear reduction having a torque frame for connecting a carrier to another structure, and wherein there is a splined connection between the torque frame and the carrier.

Epicyclic gear reductions are known, and typically include a sun gear driving a plurality of intermediate gears. The intermediate gears are mounted in a carrier. The intermediate gears have gear teeth which are driven by the sun gear, and engage gear teeth on a ring gear positioned radially outwardly of the intermediate gears.

In one type of epicyclic gear reduction the sun gear receives a drive input and the ring gear is connected to a drive output. In a second type of epicyclic gear reduction the sun gear receives the drive input and the ring gear is fixed against rotation with the carrier connected to a drive output.

A torque frame connects the carrier either to a static housing, or to the drive output shaft. In known epicyclic gear reductions, the torque frame has fingers extending in an axial direction and into openings in the carrier.

SUMMARY OF THE INVENTION

In a featured embodiment, a gas turbine engine includes a turbine section having at least one turbine rotor. A compressor section includes at least one compressor rotor, and a propulsor. The at least one turbine rotor is connected to drive an epicyclic gear reduction to in turn drive the propulsor at a slower speed than the at least one turbine rotor. The epicyclic gear reduction includes a sun gear for receiving a drive input from the at least one turbine rotor and having gear teeth engaging gear teeth on a plurality of intermediate gears. The intermediate gears are mounted within a carrier. The teeth on the intermediate gears also engage teeth on a ring gear. One of the carrier and the ring gear is connected to drive a propulsor drive shaft to in turn drive the propulsor, and the other of the carrier and the ring gear connected to static structure, with the carrier connected to either the propulsor drive shaft or the static structure through a torque frame. The torque frame is connected to the carrier at a radially outer location through a splined connection.

In another embodiment according to the previous embodiment, the splined connection has at least two splines on an inner periphery of the torque frame engaging with at least one spline on an outer periphery of the carrier.

In another embodiment according to any of the previous embodiments, both the carrier and the torque frame have windows such that the teeth on the intermediate gears extend radially outwardly of the torque frame to engage the teeth on the ring gear.

In another embodiment according to any of the previous embodiments, the torque frame has a rail extending axially beyond a rear end of the carrier.

In another embodiment according to any of the previous embodiments, the torque frame is connected to the propulsor drive shaft.

In another embodiment according to any of the previous embodiments, the carrier is connected to the propulsor drive shaft through a splined connection.

In another embodiment according to any of the previous embodiments, a spanner nut is tightened to hold the propulsor drive shaft to the torque frame.

In another embodiment according to any of the previous embodiments, the spanner nut is positioned radially outwardly of the propulsor drive shaft, and is threadably adjusted on the outer periphery of the propulsor drive shaft.

In another embodiment according to any of the previous embodiments, the spanner nut is connected on threads within an inner periphery of the torque frame.

In another embodiment according to any of the previous embodiments, the spline teeth between the carrier and the torque frame are crowned and have a thicker intermediate portion.

In another embodiment according to any of the previous embodiments, the ring gear is connected to drive the propulsor drive shaft.

In another embodiment according to any of the previous embodiments, both the carrier and the torque frame have windows such that the teeth on the intermediate gears extend radially outwardly of the torque frame to engage the teeth on the ring gear.

In another embodiment according to any of the previous embodiments, the torque frame is connected to the propulsor drive shaft.

In another embodiment according to any of the previous embodiments, the carrier is connected to the propulsor drive shaft through a splined connection.

In another embodiment according to any of the previous embodiments, a spanner nut is tightened to hold the propulsor drive shaft to the torque frame.

In another embodiment according to any of the previous embodiments, the torque frame is connected to the propulsor drive shaft.

In another embodiment according to any of the previous embodiments, the carrier is connected to the propulsor drive shaft through a splined connection.

In another embodiment according to any of the previous embodiments, a spanner nut is tightened to hold the propulsor drive shaft to the torque frame.

In another embodiment according to any of the previous embodiments, the ring gear is connected to drive the propulsor drive shaft.

In another embodiment according to any of the previous embodiments, the torque frame has a rail extending axially beyond a rear end of the carrier.

The present disclosure may include any one or more of the individual features disclosed above and/or below alone or in any combination thereof.

These and other features of the present invention can be best understood from the following specification and drawings, the following of which is a brief description.

BRIEF DESCRIPTION OF THE DRAWINGS

FIG. 4A shows a connection between a carrier, an output shaft and a torque frame in a disclosed embodiment.

FIG. 4B shows an optional feature for a connection between a carrier and the output shaft.

FIG. 4C shows an embodiment wherein the carrier and output shaft are formed as an integral piece.

FIG. 4D shows an alternative embodiment shape spline.

FIG. 5B shows a detail of the torque frame.

FIG. 5C shows a perspective view with further details of the torque frame.

FIG. 6 shows a distinct application for the torque frame of this disclosure.

DETAILED DESCRIPTION

Figure 1:
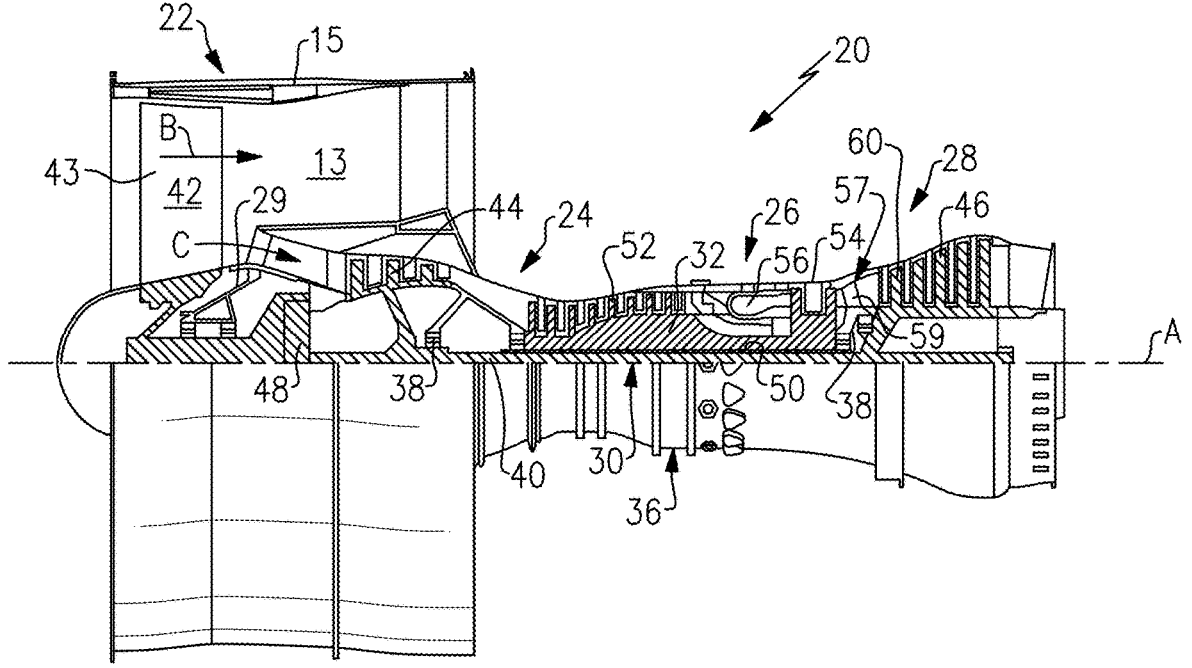
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram} ° R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
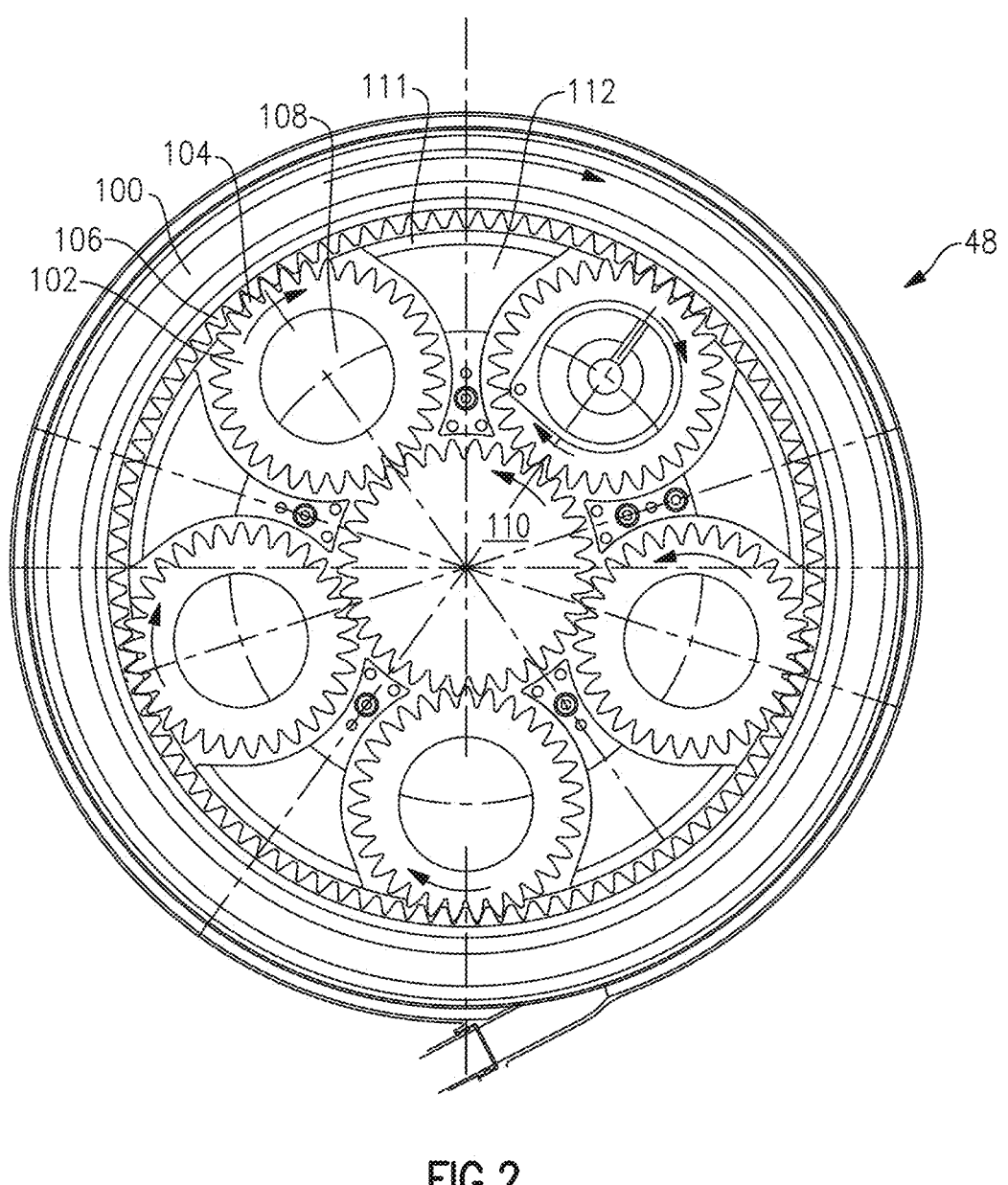
FIG. 2 is a cross-sectional view through a gear reduction.

FIG. 2 shows a gear reduction 48 which may be incorporated into an engine such as the FIG. 1 engine. A plurality of intermediate gears 102 have teeth 104 engaging teeth 106 on a ring gear 100. The intermediate gears 102 are mounted on journal pins 108. A sun gear 110 receives a drive input to in turn drive the intermediate gears 102. A torque frame 111 is shown radially intermediate a carrier 112 and the ring gear 100.

Figure 3:
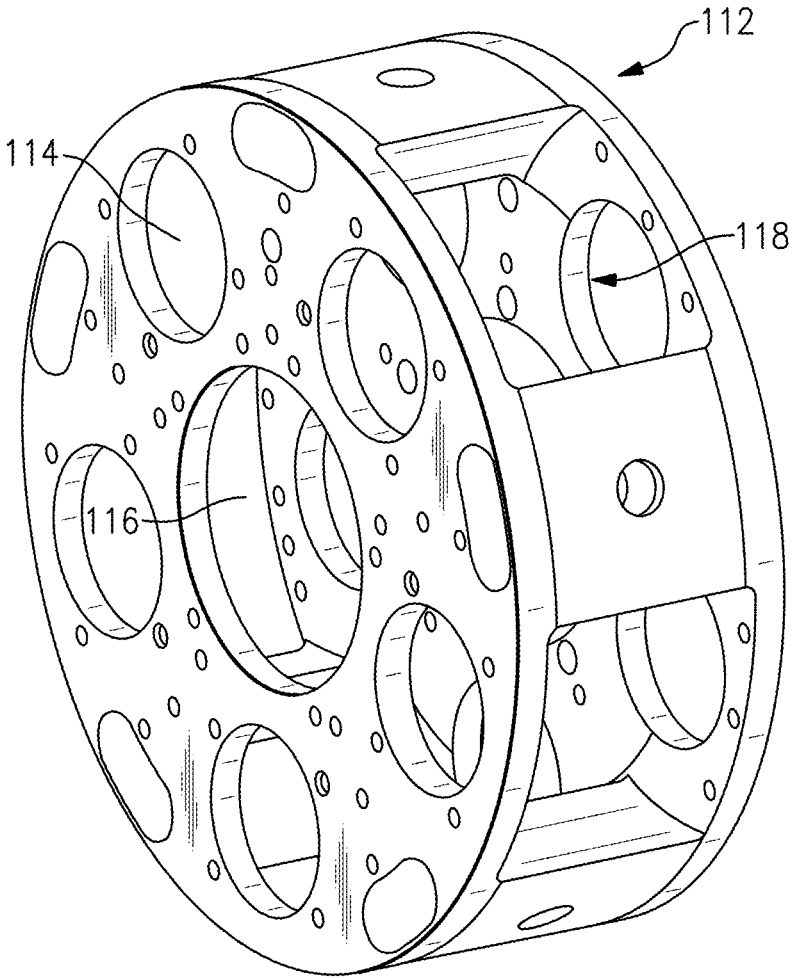
FIG. 3 shows a carrier as found in a disclosed gear reduction.

FIG. 3 shows the carrier 112 having openings 114 to receive the intermediate gears 102. Further, windows 118 allow the teeth 104 of the intermediate gears 102 to extend radially outwardly to engage the teeth 106 and the ring gear 100. An opening 116 receives the sun gear 110.

FIG. 4A shows details of the carrier 112, torque frame 111, and a propulsor drive shaft 120. Propulsor drive shaft 120 drives a propulsor 119, which may be a fan, such as shown in FIG. 1, or may be an open rotor without an outer fan case. The enlarged portion of FIG. 4A better shows the connection between the torque frame 111, the propulsor drive shaft 120 and the carrier 112. As shown, there are inter fitting splines 124 and 126 providing a connection between the torque frame 111 and the carrier 112. The splines are crowned, and follow a circular path along the tooth width such that a maximum tooth thickness is located in the middle of the tooth width. This allows the torque frame to work in torsion primarily. This facilitates the torque frame better reacting to the torque it will see in operation.

A forward end of the torque frame 111 has a spline connection 128 with splines on the propulsor drive shaft 120. A spanner nut 121 is driven on threads 123 on an outer periphery of the propulsor drive shaft 120 to secure the structure. The propulsor 119 is shown schematically driven by propulsor drive shaft 120.

A rear rail 199 is shown rearwardly of the spline 124. Rear rail 199 has a rearmost portion 300 extending beyond a rear end 301 of carrier 112.

The rear rail 199 extends about 360 degrees as a full hoop. The rear rail 199 provides torsional stiffness to the torque frame 111. It lessens the chance that the torque frame 111 winds up excessively under the torque transmitted by the carrier 112 to the propulsor shaft. Without the rear rail 199 contact stresses at the spline may be concentrated at a forward end. Stresses in the torque frame body, and in particular in the corner of the pockets, may also be high. Still, the rear rail 199 is optional, and this application extends to torque frames without the feature.

FIG. 4B shows an alternative connection 200 between a torque frame 211 and a propulsor drive shaft 220. Here flanges 221 and 212 abut and are bolted together by bolts 214.

FIG. 4C shows an embodiment 228 wherein the propulsor drive shaft 232, and torque frame 230 are formed as an integral one piece part.

FIG. 4D shows an embodiment 230, wherein the splines 232 on the torque frame 233 and splines 234 on the carrier 235 are square, that is without the crown shape.

Figure 5A:
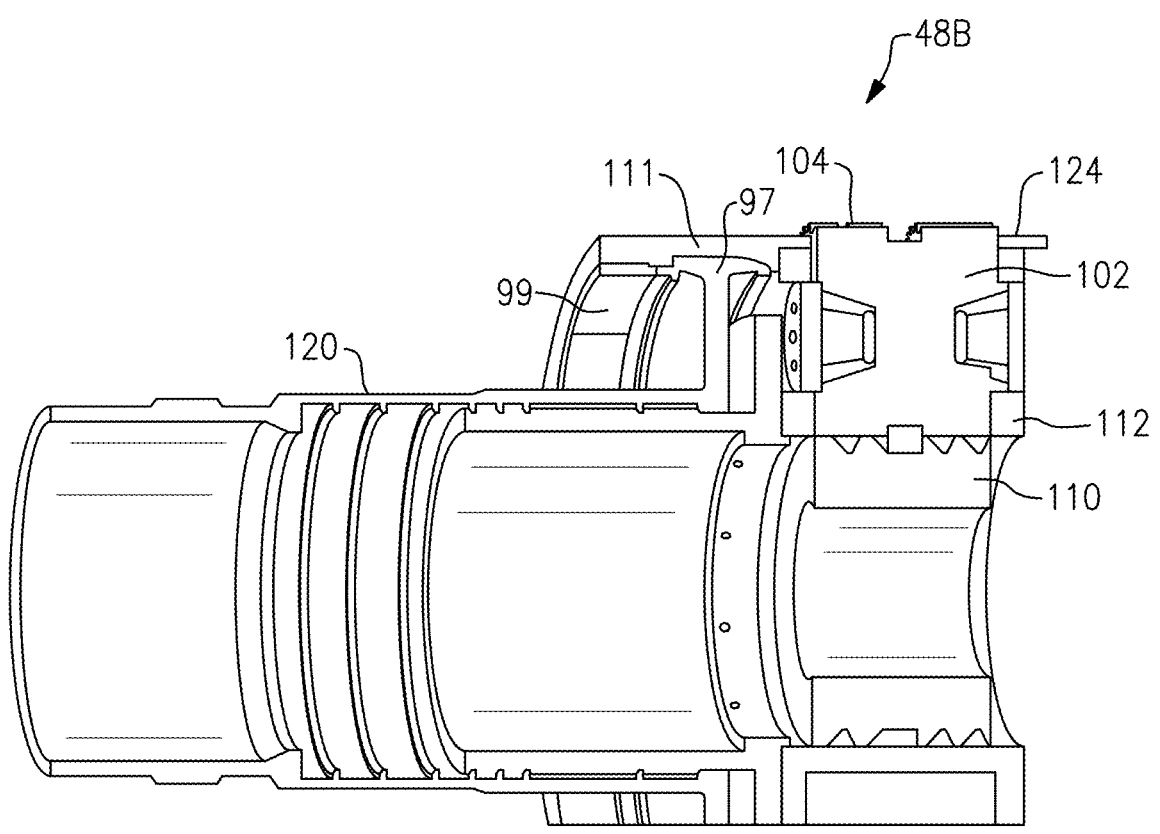
FIG. 5A shows further features of the torque frame, drive output and intermediate gear.

FIG. 5A shows a slightly different embodiment 48B wherein the torque frame extends axially forward of a connecting portion 97 of the propulsor drive shaft 120. Thus, the spanner nut 99 is now threaded into an inner peripheral surface of the torque frame 111. Here the sun gear 110 engages the intermediate gears 102. The torque frame 111 has a radially outer surface 124, and the teeth 104 of the intermediate gears extend radially outwardly of the radially outer surface 124.

As shown in FIG. 5B, the torque frame 112 has the radially outer surface 124 with the gears 102 extending further radially outwardly. There are windows 142 in the torque frame 111 to allow the gears 102 to extend outwardly.

As shown in FIG. 5C, the torque frame is essentially cylindrical with windows 142 extending through a thickness. There are axial portions 160 and 162 which are solid cylindrical surfaces on each side of the windows 142.

FIG. 6 shows another embodiment 180. While the embodiments disclosed to this point have a carrier 112 which drives the propulsor output shaft 120 through the torque frame 111, FIG. 6 shows a gear reduction 180 wherein the ring gear 190 drives a propulsor drive shaft 192 to in turn drive the propulsor 194. In this embodiment the torque frame 182 connects the carrier 184 through a flexible connection 183 to a static housing member 181. In such structure the sun gear 186 again drives intermediate gears 188, but now the ring gear 190 drive the propulsor drive shaft 192. This embodiment would also have a spline connection as disclosed above.

Although embodiments of this disclosure have been shown, a worker of ordinary skill in this art would recognize that modifications would come within the scope of this disclosure. As one example, while the propulsor is disclosed as a fan it could also be an open rotor. For that reason, the following claims should be studied to determine the true scope and content of this disclosure.

What is claimed is:

1. A gas turbine engine comprising:
a turbine section having at least one turbine rotor, a compressor section including at least one compressor rotor, and a propulsor, the at least one turbine rotor connected to drive an epicyclic gear reduction to in turn drive the propulsor at a slower speed than the at least one turbine rotor;
the epicyclic gear reduction including a sun gear for receiving a drive input from the at least one turbine rotor and having gear teeth engaging gear teeth on a plurality of intermediate gears, the intermediate gears mounted within a carrier, the teeth on the intermediate gears also engaging teeth on a ring gear;
one of the carrier and the ring gear connected to drive a propulsor drive shaft to in turn drive the propulsor, and the other of the carrier and the ring gear connected to static structure, with the carrier connected to either the propulsor drive shaft or the static structure through a torque frame, the torque frame connected to the carrier at a radially outer location through a splined connection; and
wherein the torque frame has a rail extending axially beyond a rear end of the carrier.

2. The gas turbine engine as set forth in claim 1, wherein the splined connection has at least two splines on an inner periphery of the torque frame engaging with at least one spline on an outer periphery of the carrier.

3. The gas turbine engine as set forth in claim 2, wherein both the carrier and the torque frame have windows such that the teeth on the intermediate gears extend radially outwardly of the torque frame to engage the teeth on the ring gear.

4. The gas turbine engine as set forth in claim 3, wherein the torque frame is connected to the propulsor drive shaft.

5. The gas turbine engine as set forth in claim 4, wherein the torque frame is connected to the propulsor drive shaft through a splined connection.

6. The gas turbine engine as set forth in claim 5, wherein a spanner nut is tightened to hold the propulsor drive shaft to the torque frame.

7. The gas turbine engine as set forth in claim 6, wherein the spanner nut is positioned radially outwardly of the propulsor drive shaft, and is threadably adjusted on the outer periphery of the propulsor drive shaft.

8. The gas turbine engine as set forth in claim 6, wherein the spanner nut is connected on threads within an inner periphery of the torque frame.

9. The gas turbine engine as set forth in claim 6, wherein the spline teeth between the carrier and the torque frame are crowned and have a thicker intermediate portion.

10. The gas turbine engine as set forth in claim 3, wherein the ring gear is connected to drive the propulsor drive shaft.

11. The gas turbine engine as set forth in claim 1, wherein both the carrier and the torque frame have windows such that the teeth on the intermediate gears extend radially outwardly of the torque frame to engage the teeth on the ring gear.

12. The gas turbine engine as set forth in claim 11, wherein the torque frame is connected to the propulsor drive shaft.

13. The gas turbine engine as set forth in claim 12, wherein the torque frame is connected to the propulsor drive shaft through a splined connection.

14. The gas turbine engine as set forth in claim 13, wherein a spanner nut is tightened to hold the propulsor drive shaft to the torque frame.

15. A gas turbine engine comprising:

a turbine section having at least one turbine rotor, a compressor section including at least one compressor rotor, and a propulsor, the at least one turbine rotor connected to drive an epicyclic gear reduction to in turn drive the propulsor at a slower speed than the at least one turbine rotor;

the epicyclic gear reduction including a sun gear for receiving a drive input from the at least one turbine rotor and having gear teeth engaging gear teeth on a plurality of intermediate gears, the intermediate gears mounted within a carrier, the teeth on the intermediate gears also engaging teeth on a ring gear;

one of the carrier and the ring gear connected to drive a propulsor drive shaft to in turn drive the propulsor, and the other of the carrier and the ring gear connected to static structure, with the carrier connected to either the propulsor drive shaft or the static structure through a torque frame, the torque frame connected to the carrier at a radially outer location through a splined connection;

wherein the torque frame is connected to the propulsor drive shaft;

wherein the torque frame is connected to the propulsor drive shaft through a splined connection; and wherein a spanner nut is tightened to hold the propulsor drive shaft to the torque frame.

16. The gas turbine engine as set forth in claim 1, wherein the ring gear is connected to drive the propulsor drive shaft.

17. The gas turbine engine as set forth in claim 15, wherein the torque frame has a rail extending axially beyond a rear end of the carrier.

18. The gas turbine engine as set forth in claim 15, wherein the torque frame has a rail extending axially beyond a rear end of the carrier.

\* \* \* \* \*